United States Patent
O'Hanlon

(10) Patent No.: US 9,516,392 B2
(45) Date of Patent: Dec. 6, 2016

(54) METHOD AND SYSTEM FOR CONTENT DELIVERY

(71) Applicant: Linius (AUST) Pyt Ltd., Melbourne (AU)

(72) Inventor: Finbar O'Hanlon, Victoria (AU)

(73) Assignee: Linius (AUST) Pyt Ltd., Victoria (AU)

( * ) Notice: Subject to any disclaimer, the term of this patent is extended or adjusted under 35 U.S.C. 154(b) by 50 days.

(21) Appl. No.: 13/833,431

(22) Filed: Mar. 15, 2013

(65) Prior Publication Data

US 2013/0291042 A1    Oct. 31, 2013

Related U.S. Application Data

(63) Continuation of application No. 12/670,430, filed as application No. PCT/AU2008/001190 on Aug. 15, 2008, now Pat. No. 8,893,203.

(60) Provisional application No. 60/956,405, filed on Aug. 17, 2007.

(51) Int. Cl.
*H04N 7/173* (2011.01)
*H04N 21/643* (2011.01)
(Continued)

(52) U.S. Cl.
CPC ......... *H04N 21/64322* (2013.01); *G11B 27/10* (2013.01); *H04N 21/2368* (2013.01);
(Continued)

(58) Field of Classification Search
CPC .............. H04N 7/17318; H04N 21/4622; H04N 21/8586; H04N 21/235; H04N 21/435
USPC ............................ 725/93, 109, 110, 112, 116
See application file for complete search history.

(56) References Cited

U.S. PATENT DOCUMENTS 6,141,693 A    10/2000   Perlman et al.
6,389,467 B1   5/2002    Eyal
(Continued)

FOREIGN PATENT DOCUMENTS

CN    1992890        7/2007
JP    2001-101190    4/2001
(Continued)

OTHER PUBLICATIONS

Boll et al., "Multimedia Document Models: Sealed Fate or Setting Out for New Shores?", Multimedia Tools and Applications, 11, 267-279, 2000.
(Continued)

*Primary Examiner* — Nasser Goodarzi
*Assistant Examiner* — Fred Peng
(74) *Attorney, Agent, or Firm* — Womble, Carlyle, Sandridge & Rice LLP

(57) ABSTRACT

A method and system for providing video content on a data network connected device having a display and a device display controller including a player. The method comprises the steps of a data network connected device, accesses a reference file including a plurality of player control parameter values and linking data for one or more content sources. Play control commands are provided to the player based on the play control parameter values. Content data is acquired by the player from one or more content sources via the data network using the linking data, and the content acquired from each source played on the display in accordance with the player control commands. The reference file may be a pre-existing reference file or a reference file created in response to a request to play the video content data. A reference file compiler is provided for generating the reference file.

48 Claims, 7 Drawing Sheets

(51) Int. Cl.

| | | |
|---|---|---|
| *G11B 27/10* | (2006.01) | |
| *H04N 21/2368* | (2011.01) | |
| *H04N 21/43* | (2011.01) | |
| *H04N 21/434* | (2011.01) | |
| *H04N 21/462* | (2011.01) | |
| *H04N 21/81* | (2011.01) | |
| *H04N 21/8543* | (2011.01) | |
| *H04N 21/858* | (2011.01) | |
| *H04N 21/472* | (2011.01) | |

(52) U.S. Cl.
CPC ...... *H04N21/4307* (2013.01); *H04N 21/4341* (2013.01); *H04N 21/4622* (2013.01); *H04N 21/47217* (2013.01); *H04N 21/8193* (2013.01); *H04N 21/858* (2013.01); *H04N 21/8543* (2013.01)

(56) References Cited

U.S. PATENT DOCUMENTS

| | | | |
|---|---|---|---|
| 6,970,602 B1 | 11/2005 | Smith et al. | |
| 7,962,948 B1* | 6/2011 | Girouard et al. | 725/115 |
| 2002/0147985 A1* | 10/2002 | Miyajima et al. | 725/109 |
| 2003/0110503 A1 | 6/2003 | Perkes | |
| 2003/0145338 A1 | 7/2003 | Harrington | |
| 2003/0161614 A1 | 8/2003 | Yanagihara et al. | |
| 2003/0177503 A1 | 9/2003 | Sull et al. | |
| 2003/0196204 A1 | 10/2003 | Thiagarajan et al. | |
| 2004/0049624 A1 | 3/2004 | Salmonsen | |
| 2004/0055016 A1* | 3/2004 | Anipindi et al. | 725/110 |
| 2004/0163123 A1* | 8/2004 | Okada et al. | 725/116 |
| 2004/0250015 A1 | 12/2004 | Ando | |
| 2005/0053360 A1 | 3/2005 | Jung et al. | |
| 2005/0076364 A1 | 4/2005 | Dukes et al. | |
| 2006/0026302 A1 | 2/2006 | Bennett et al. | |
| 2006/0117344 A1 | 6/2006 | Lamkin et al. | |
| 2006/0146772 A1 | 7/2006 | Geva et al. | |
| 2006/0184978 A1 | 8/2006 | Casey | |
| 2007/0033170 A1 | 2/2007 | Sull et al. | |
| 2007/0033521 A1 | 2/2007 | Sull et al. | |
| 2007/0124781 A1* | 5/2007 | Casey et al. | 725/94 |
| 2010/0257569 A1 | 10/2010 | O'Hanlon | |

FOREIGN PATENT DOCUMENTS

| | | |
|---|---|---|
| KR | 10 2004 00584 | 7/2004 |
| KR | 10 2004 00746 | 8/2004 |
| KR | 10-2004-0104481 | 12/2004 |
| KR | 10-2005-0002681 | 1/2005 |
| WO | WO 02/08948 | 1/2002 |
| WO | WO 03/075564 | 9/2003 |

OTHER PUBLICATIONS

Fegette, Scott, "Dreamweaver and Flash Video", MAX The 2005 Macromedia Conference, Oct. 17, 2005.

Supplementary European Search Report issued Aug. 25, 2010 for the corresponding European Patent Application No. 08782938.8.

Office Action issued Oct. 29, 2012 in corresponding South Korean Application No. 10-2010-7005809.

* cited by examiner

| | | |
|---|---|---|
| mov | Movie 611 | |
| mvhd | Movie header 612 | |
| trak | Track | |
| tkhd | Track header | |
| edts | Edits | |
| elst | Edit list | |
| mdia | Media | |
| mdhd | Media handler header | |
| hdlr | Handler description | |
| minf | Media information | |
| smhd | Sound media header | |
| hdlr | Handler description | |
| dinf | Data handler information | |
| dref | Data reference | |
| stbl | Sample table | |
| stsd | Sample descriptions | |
| stts | Sample to time | |
| stsc | Sample to chunk | |
| stsz | Sample sizes | |
| stco | Chunk offset table | |
| meta | Meta data | |
| udata | User data | |
| trak | Track | |
| tkhd | Track header | |
| edts | Edits | |
| elst | Edit list | |
| mdia | Media | |
| mdhd | Media handler header | |
| hdlr | Handler description | |
| minf | Media information | |
| vmdh | Video media header | |
| hdlr | Handler description | |
| dinf | Data handler information | |
| dref | Data reference | |
| stbl | Sample table | |
| stsd | Sample descriptions | |
| stts | Sample to time | |
| stsc | Sample to chunk | |
| stsz | Sample sizes | |
| stco | Chunk offset table | |
| udata | User data | |
| meta | Meta data | |
| udta | User data | |
| play | Play command | |
| WLOC | Default window location | |
| SelO | Play selection only | |
| AllF | Play all frames | |

Figure 6

METHOD AND SYSTEM FOR CONTENT DELIVERY

CROSS REFERENCE TO RELATED APPLICATION

This application is a continuation of U.S. patent application Ser. No. 12/670,430; filed May 5, 2010; which entered the U.S. national stage under 35 U.S.C. §371 based on International Application No. PCT/AU2008/001190; filed Aug. 15, 2008; which claims the benefit of U.S. Provisional Patent Application Ser. No. 60/956,405; filed Aug. 17, 2007, the contents of which are incorporated herein in their entirety by reference.

FIELD OF THE INVENTION

The technical field of the present invention is digital video content delivery. An example of an application of the present invention is for Internet television delivery.

BACKGROUND OF THE INVENTION

It is known to provide content accessible over a network such as the Internet. A common way to access content over the Internet on a device such as a personal computer is by using a web browser and a search engine to locate desired content. Where the content is video content, such as movies or video clips, the content can be viewed using a video player application, also known as a plug-in, provided in the web browser. The play of the video content is controlled through the web site using the plug-in player. Problems with the quality of the viewing experience can include poor resolution of images or pixilation of images, jitter or halting of the moving image, such problems are often due to bandwidth limitations or processing capacity.

A known system attempts to overcome the above problems by compiling and formatting video data in a specific format for providing to users over the Internet which can be played by a special player designed to play the specific format video data files. This system has drawbacks from the user side, due to having to purchase the special player, and from the video content provider side, as it is necessary to re-format any video content for use with the player.

There is a need for a system which provides an improved internet video content access and viewing experience.

SUMMARY OF INVENTION

According to one aspect of the present invention there is provided a method of providing video content on a data network connected device having a device display controller including a native player, the method comprising the steps of:

accessing, by the data network connected device, a reference file including a plurality of player control parameter values and linking data for one or more designated content sources;

providing play control commands to the native player based on the play control parameter values, including play control commands directing the native player to acquire content data compatible with the native player from within a content data file of one or more of the designated content data sources via the data network using the linking data;

acquiring content data by the native player from the one or more content sources; and playing, by the native player, the content acquired from each content source in accordance with the player control commands.

The reference file may be a pre-existing reference file or a reference file created in response to a request to play the video content data. The method can further comprise a step of creating the reference file.

In some embodiments the reference file is created in response to a request for playing the video content data by a target device. In this embodiment the method can include the step of interrogating the target device to read target device media player capabilities, such that the reference file can be created adapted for the target device.

According to another aspect of the present invention there is a method of providing access to video content, the method comprising the steps of:

storing video content data accessible via a data network;

providing a reference file including linking data and player control parameter values, the linking data including link data for designated video content whereby play commands based on the player control parameter values direct a native player of a user device to acquire content data compatible with the native player from within a content data file of one or more of the designated content data sources via the data network using the linking data; and making the reference file accessible whereby access of the reference file by a user device enables the user device native player to link to and play at least the designated video content.

According to another aspect of the present invention there is provided a system for providing video content via a data network comprising:

a player interface adapted to provide control instructions to a player installed on the user device; and a reference file including:

player control parameter values; and linking data for one or more designated content sources including a source for video content, whereby, when a reference file is provided to a player interface, the player interface uses the player control parameter values and linking data to instruct the player installed on the user device to:

acquire video content data compatible with the native player from within a content data file of one or more of the designated content sources in accordance with the linking data; and play the video content on the user device in accordance with the player control parameter values.

According to another aspect of the present invention there is provided a reference file compiler adapted to:

receive linking data defining where video content stored on a network can be accessed from for at least one designated video content source;

define control parameter values for use by a player interface to provide commands to a device's native player to direct the native player to acquire content data compatible with the native player from within a content data file of each designated video content source via a data network using the linking data and for playing video content acquired from each video content source; and compile a reference file including the linking data and player control parameter values.

Player control parameter values in the context of this document refers to data used for controlling the aspects of playing video and audio data and controlling associated functions such as actions to be taken in response to user inputs in user interactive embodiments. For example player control parameter values can include values defining the display dimensions in pixels for playing video content or flags used to define player settings.

Throughout the specification the term video content file is used to refer to audio/visual content, such as a movie, television programme or film clip, stored in a computer readable form in a data file. The audio/visual data may be stored in a data file as one or more tracks each comprising a portion of the audio visual content, for example one or more video tracks, one or more audio tracks and one or more timing tracks used for synchronisation of the audio and video during playback.

Playing video content should be clearly understood by a skilled person to refer to reproducing the audio/visual content for human perception by rendering visual images on a display or using a projector and rendering audio content audibly, for example using speakers or headphones.

BRIEF DESCRIPTION OF THE DRAWINGS

An embodiment, incorporating all aspects of the invention, will now be described by way of example only with reference to the accompanying drawings in which

FIG. 6 illustrates an example data structure of a data file in accordance with an embodiment.

DETAILED DESCRIPTION

Embodiments of the present invention provide a method and system for providing video content via a data network for display on a user device having a display and a device display controller including a player. A reference file including a plurality of player control parameter values and linking data for one or more content sources is provided. The device player uses linking data from the reference file to acquire content for display on the user device. A player interface provides play control commands to the player based on the play control parameter values to control the presentation of the content acquired from each source on the display.

The reference file can be pre-prepared and stored, accessible via the data network by user devices, for example via a web site. Alternatively the reference file can be created in response to a request.

Figure 1:
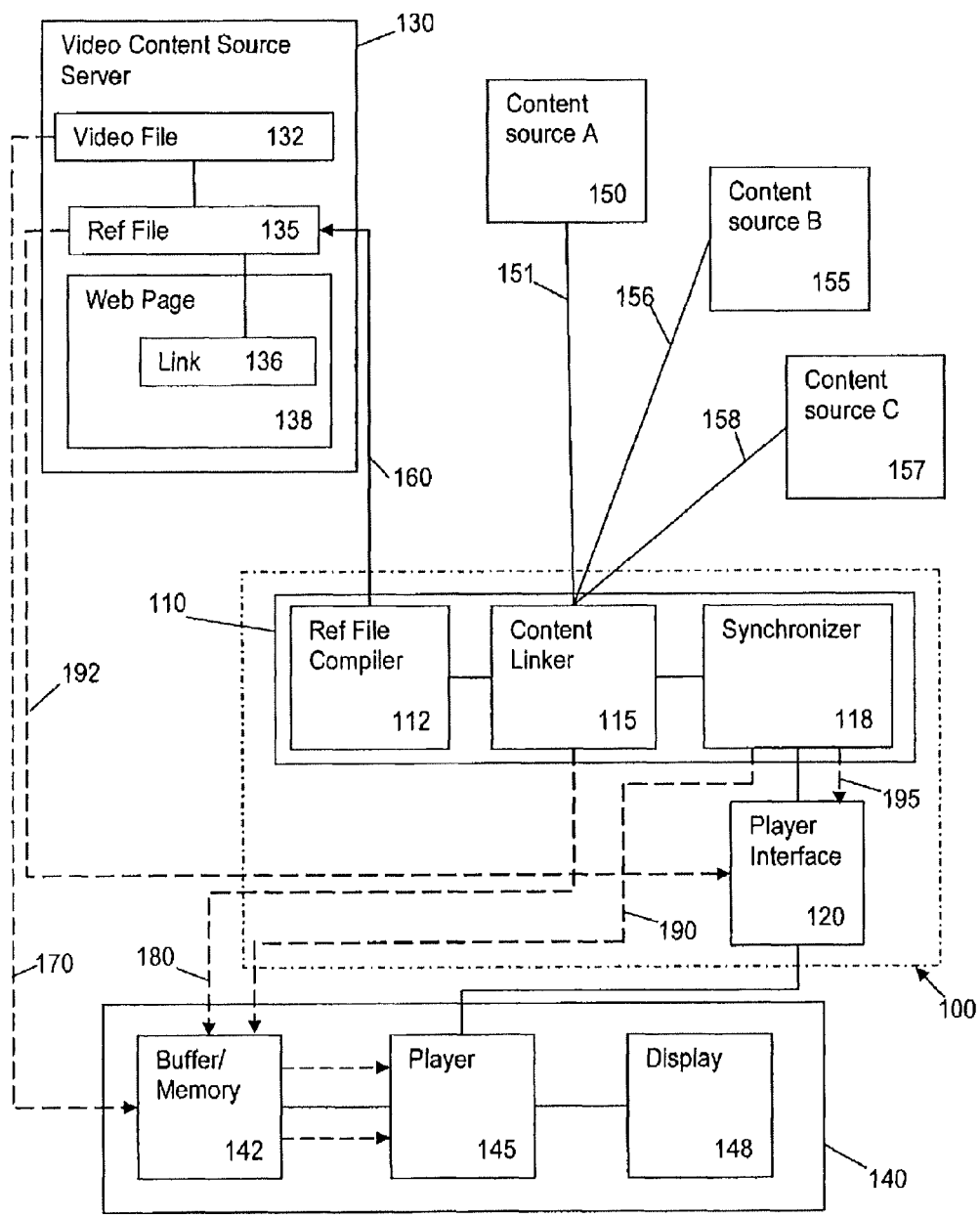
FIG. 1 shows a block diagram of an embodiment of the system of the present invention.

An embodiment of the system is illustrated in block diagram form in FIG. 1. The system 100 comprises a player interface 120 adapted to provide display control instructions to a player 145 on a user device 140, and a support server 110.

The support server 110 has a reference file compiler 112 adapted to create, for a designated video content file 132, a reference file 135. The reference file 135 includes player control parameter values and linking data for one or more content sources, including the source 130 for the designated video content file 132. The player interface 120 uses the player control parameter values and linking data to instruct the player 145 installed on the user device 140 to acquire video content data from one or more data sources and play the video content.

Some embodiments of the system provide pre-existing reference files accessible via the data network and other embodiments create reference files on demand, for example in response to a request to download and play a video content file.

FIG. 1 illustrates an example where reference files are created and stored on a video content source server 130 so the pre-existing reference files can be accessed by users.

Figure 2:
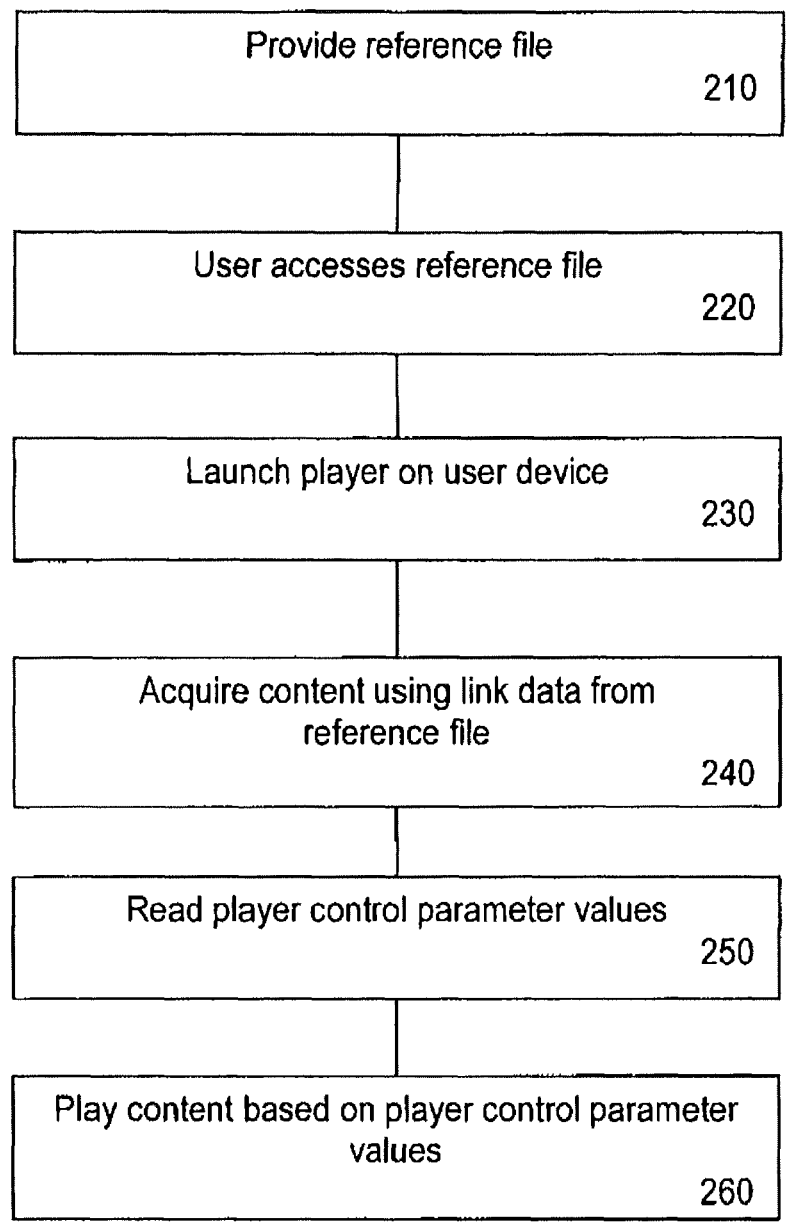
FIG. 2 is a flowchart illustrating the creation of a reference file according to an embodiment of the present invention.

An example of a process for playing a video content file by a user is illustrated in FIG. 2. A reference file 135 including linking data and player control parameter values is provided in a manner enabling the reference file to be accessed by the user device 210, for example as illustrated in FIG. 1 the reference file is accessible via a hyperlink 136 from an Internet web site 138. A user accesses 220 the reference file 135 via the hyperlink 136.

When the user accesses a reference file 220, this causes the reference file 135 to be read by the player interface 120. The player interface 120 causes the user device to launch 230 the player 145 if the player is not already executing.

It should be appreciated that the player 145 can be embedded in the operating system of a user device. For example the player decodes video content data and drives device display hardware to display the video content. The player may be implemented as a function of the operating system kernel, in middleware, as an application programming interface (API) etc. The player interface 120 can be an application running on the user device which provides higher level functions for controlling the player 145, for example interpreting commands input by a user or control parameter values read from a reference file and providing the appropriate control instructions to the player 145.

Based on the linking data the player 145 can acquire content data directly from one or more content sources 240. Thus the user device can link directly to the content data file 132 on the content provider server 130.

The timing and manner of the content data acquisition 240 may be controlled in accordance with parameter values associated with each content source, for example content may be downloaded from one or more sources sequentially in a particular order, and data may be acquired as a data stream to be played as it is acquired from one or more sources.

The player interface 120 can read player control parameter values 250 from the reference file as necessary to control the player 260. For example, the reference file 135 may include parameter values for global commands which are to be executed initially when the reference file 135 is accessed, and other parameter values for commands which may be executed at a later time or in response to certain events, for example at the start or end of play of a particular content file, in response to a user command, or after a given time period.

In some embodiments the player interface is a software or middleware application for controlling the player and interpreting external user inputs which executed on the user device hardware. In alternative embodiments the player interface can be an application executing on a network server and player control instructions are delivered to the user device player via the network. The player interface is an application adapted to interpret the player control parameter values and linking data contained in the reference file and provide control instructions to the device player as required. The player interface may be optional in some embodiments, for example in an embodiment where video content is simply played with minimal or no user interactive functionality. In this case the reference file is constructed such that the player can simply read the reference file, as if opening a video file stored in device memory for play, and link to the content data and play the content data without requiring any further control instructions. In an alternative embodiment the player and player interface functions may be core components of the device operating system, for example in the case of a television set top box. In this case the player and player interface functions are all implemented in the device operating system.

The reference file can include commands, for example provided as executable scripts or machine readable executable instructions. Such commands may be used for player control or other functions for example billing, customer feedback, interactivity, or digital rights management (DRM). These commands can be interpreted by the player interface and, if necessary, the player interface can control the player in accordance with the scripts. In some cases scripts may require no information to be passed on to the player. For example in the case of DRM or billing, the script may instruct the player interface to provide data to a monitoring service via the network when play of a movie starts and stops or when the movie has been played in its entirety, this data can them be used for billing a users account or recording the play of the movie for DRM royalty allocation purposes. It should be appreciated that in this case the player requires no commands.

The reference file can include parameter values and control commands related to file formatting of the content data file. In some embodiments the parameter values and control commands can be related to translation of file formats. For example, one device may require a different file format than that of another device or from the format the content data file is stored in on the content file server.

A reference file for the target device can include a translating video structure for translating the content data file format from its stored format to a format playable by the target device. For example, to enable video and audio content data stored in a .mov format on a content data server to be played by the target device as if the file was in adobe flash format. This is achieved in an embodiment by the reference file being created having a container file format compatible with the target device player independent of the format of the content data file stored on the content server. The linking data included in the reference file can be adapted to link only to the sections of the content data file storing video and audio data which is streamed to the target device, such that it appears to the target device that it is playing the video and audio data from a content data file in the format of the container file format used in the reference file, which was chosen for compatibility with the target device.

In one embodiment the control parameter values of the reference file provide a translated video structure which causes the reference file to appear to the player as a content data file having a different structure to that of the original content data file. Alternatively command instructions may be provided in the reference file for use when translating the file from one format to another. It should be appreciated that the translated video structure and control commands of the alternative embodiments enable the same video content to be delivered to the player using a different file format that the content data file as stored on a content provider server. This has the advantage that the content service provider does not need to store the same content data in a plurality of different file formats to ensure compatibility with user devices.

Figure 3:
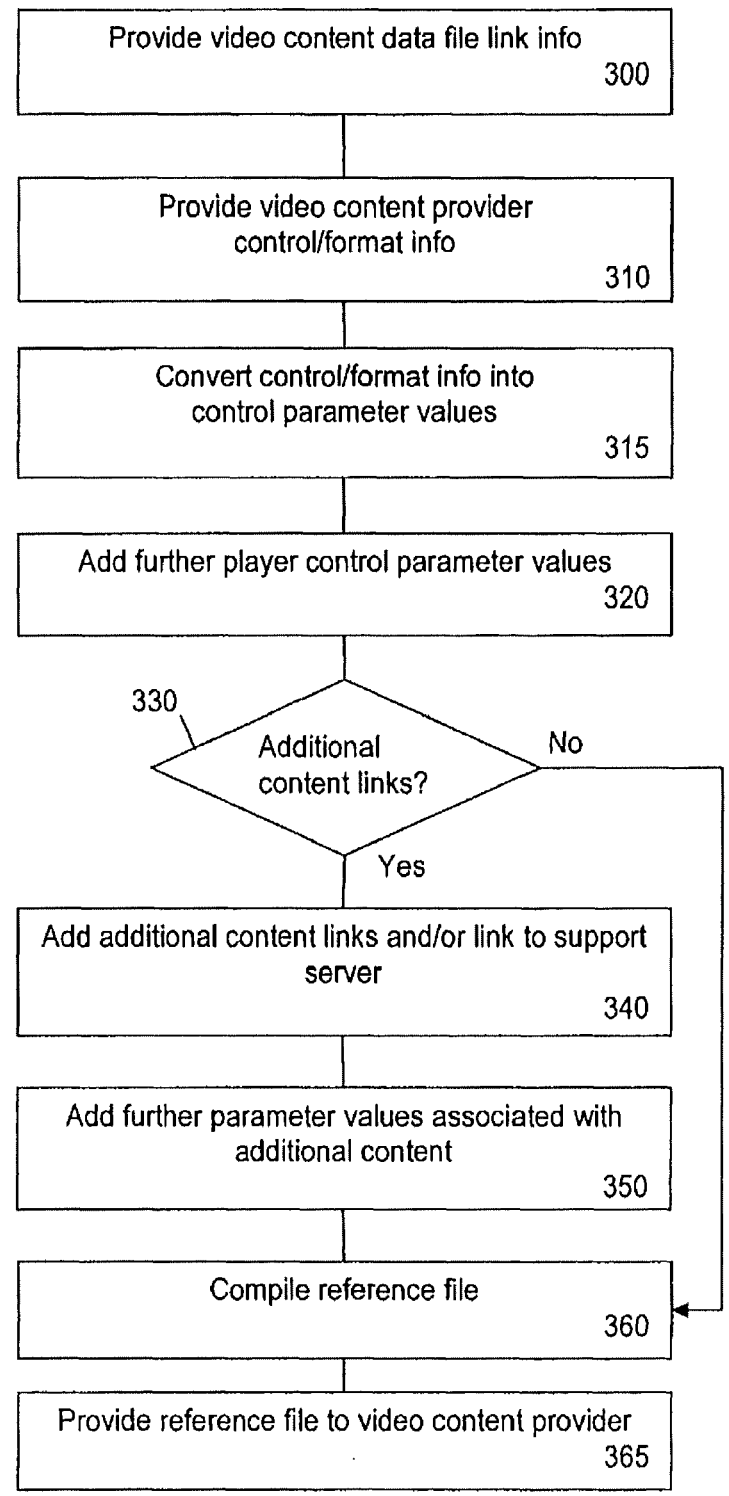
FIG. 3 is a flowchart illustrating accessing content using a reference file and presenting content on the user device display.

The process for creating a reference file 135 by the reference file compiler 112 is illustrated in FIG. 3. A video content data file 132 is stored on the video content provider server 130 in a format desired by the video content provider. A link to this stored video content data file 132 is provided 300 to the reference file compiler 112. The video content provider is able to also specify control or formatting information for the video content data file and provide additional information 310. For example, the video content provider may specify that the video is to be displayed in a "letterbox" format rather than be cropped if the display dimensions of a user device do not match the aspect ratio of the video image, or specify that surround sound should automatically be used if available. Other examples of further information provided by the video content provider may include links to additional information such as alternative language subtitles or sound tracks for a movie.

The content data file 132 stored on the content provider server 130 may be stored in any number of data file formats, for example .mov format, adobe flash player format etc. However, the data file format in which the video content is stored may not be a format compatible with a target device. For example a target user device may be a personal computer (PC) adapted to play video content from a number of different file formats by the PC reading a file type and using appropriate software to open the file. However, where a target device is a television set top box, the number of file types handled by the device may be limited and further the user's ability to upgrade device software for compatibility with different file formats is severely limited. Where a content data file is in a format incompatible with target device software, typically the user needs to update the device software before the file can be played. Some embodiments of the reference file compiler enable a reference file to be created which provides a translated video structure to enable video content in an otherwise incompatible file format to be played by the target device.

Content data files typically have a defined data structure referred to herein as a container file format or data file format. Encoded audio and video data is stored as elements of data within the defined data structure. Container file formats can be defined in standard or proprietary specifications. Manufacturers of player devices can adapt the player device to be able to interpret the data from the file for playing the content data based on the defined container file data structure, in other words making the player device compatible with a container file format. The audio/visual data stored using an encoding and compression scheme also known as a codec, different codecs may be used for encoding the audio and video data components. Again codecs can be defined in proprietary or standard specifications so players can be made adapted to decode one or more different codecs for correctly decoding the encoded data and reproducing the audio visual content. Player devices also typically have file handling functions for reading and interpreting the content data file, in accordance with the container file format and decoding; and rendering functions for decoding the audio/visual data in accordance with the codec and driving the device hardware to display and reproduce the video and audio content. The encoded audio and video data stored within the container file format may use a codec for which a player device is compatible although the player device may be incompatible with the container file structure and hence unable to interpret the content data file to play the audio/visual content.

The reference compiler can be adapted to build a translated video structure using a container file format compatible with the target device and include linking data within this translated video structure to enable the target device player to directly link to and access encoded audio/visual data sections of the video content data file stored on the content data server. Alternative embodiments of the reference file compiler can generate a reference file including control commands to enable a translated video structure using a compatible container file format to be built in target device memory and the linking data to enable the device player to directly link to the encoded audio/visual data sections of the video content data file stored on the content data server.

As illustrated in FIG. 6 a video content data file 600 has a data structure in accordance with a defined content data file format specification and codec specification. The data file 600 includes a file identification section 610 which identifies the container file type 611 and includes a container file header 612. Audio and video data are stored within the file in tracks formatted in accordance with the container file format. The illustrated file has one audio track 620 and one video track 630. The file can include additional data 660 such as file meta data, user data, and play commands such as play all frames, play selection of frames, default window location etc. User data for the file can include information relevant for the entire file such as maker data, copyright statements, movie director, record company, key words or titles and content etc.

The audio track 620 includes a definition section 640, an audio sample table 645 and optional meta data and user data 648 for the audio track. The definition section 640 provides audio track information in accordance with the required container file format, and the audio sample table 645 comprises codec encoded audio data samples. The video track 630 also includes a definition section 650 which provides video track information in accordance with the container file format, a video sample table 655 comprising coded encoded video data samples, and optional metadata and user data 658.

The reference file compiler is adapted to read the content data file identification section 610 and the definition sections 640, 650 for the audio and video tracks and interpret the data in these sections. This can include reading data element values and equating these values with appropriate control parameter values. This can also include mapping of the content data file. From the mapping the reference file compiler can identify the audio and video sample table sections 645, 655 of the content data file comprising the encoded video and audio data. Any additional relevant data, such as synchronisation tracks, user data or meta data 648, 658 associated with the audio and video tracks can also be identified. For example, synchronisation data may be timing data used for synchronising subtitles of different languages with a movie. Meta data for a track can include information relevant to the data for the track such as track length, codec used etc. The user data for each track can include information relevant to the track which may be of user or interest to the user for example a composer/arranger for an audio track and for movie tracks information such as scene titles or content key words which can be used for searching or scene selection. Alternatively additional data may be related to interactive functionality. The data file may also include control instructions which may or may not be imported into the reference file depending on the nature of the commands.

The reference file compiler can then form a translated video structure in a format compatible with the target device where the target device compatibility is known. The reference file compiler 112 converts the data read from the data file identification section 610 and the definition sections 640, 650 for the audio and video tracks of the content data file into equivalent identification and definition data elements or appropriate control parameter values in accordance with the data structure chosen for compatibility with the target device.

Where necessary the reference file compiler may add appropriate control parameter values based on any desired global or general control parameter values or alternatively in accordance with content provider instructions. An example of global parameter values which may be applied to reference files, are parameter values for automatic playing of the content, defining a display area for playing the content and parameter values indicating whether to exit or return to a menu on play ending.

The reference file compiler inserts linking data based on the content file mapping. The linking data is specific to the audio and video sample table sections 645, 655 of the content data file comprising the encoded video and audio data. Thus the reference file links to addresses of sections of the content data file storing the actual video and audio data within the original content data file structure. For example, the linking data can define a specific destination server address and a relative or absolute address within the server memory where audio or video sample table is stored. Therefore the link data does not to the definition sections or any header elements of the content data file structure on the content server. The linking data may include links to a plurality of addresses depending on the content data file address mapping.

It should be appreciated that the audio and video sample tables 645, 655 include all the data required for codec decoding of the audio and video data for reproduction. Thus, the translated video structure is a container file created to give the player access the encoded audio and video data in a container file format which can be interpreted by the player. For example, the original content file has a .mov container file format and the container file format of the translated video structure may be an Adobe flash format. Within the Adobe flash container file links to the sample tables of the original .mov file are stored rather than the entire sample tables themselves. When the player loads the reference file the player links to the sample tables stored on the content server within the .mov file, rather than an address in local memory, to buffer, decode and render the encoded audio and video data.

The linking data can also link to a plurality of sample tables each of which may or may not be stored on the same server. For example, two movie files, each for the same movie, may be stored on two different servers. The first server may be adapted for fast download speeds and a premium charge incurred for data downloaded from this server. The second server may have a slower download speed but lower charged incurred for data download. The reference file compiler may be adapted to build a reference file including links to the first server for some of the encoded audio and video data and to the second server for the remaining audio and video data. For example, the reference file may link to the encoded audio and video data samples on the first server for the first five minutes of the movie, then to the encoded audio and video data samples on the second server for the remainder of the movie. This enables the fast download speed to be utilised to get the movie playing for the user quickly, the slower download speed of the second server would not be expected to effect the user's viewing experience, as the data can be downloaded from the second server and stored in temporary/buffer memory while the preceding scenes downloaded form the first server are being viewed. The slower download speed is compensated for by the relatively slow real time playing of the movie.

In alternative circumstances, where the target device compatibility is not known, the reference compiler can generate control instructions for building a translated video structure in target device memory. In this case, since the target format is not known, the reference file compiler can generate instructions for building a translated video structure based on the data elements read from the data file identification section 610 and the definition sections 640, 650 for the audio and video tracks of the content data file, mapping of the audio and video data sample tables 645, 655, and general player control instructions specified in the reference file compiler.

The control instructions can be generated as a script including instructions and parameter values for building a translated video structure in target device memory and populating this translated video structure with parameter values based on data read from the original content data file and linking data as described above for linking directly to addresses within the content data file where the encoded audio and video content is stored. For example, the control instructions may constitute a rule engine whereby an appropriate translated video structure is built by applying rules in accordance with data obtained from interrogating a target device player. The script may be generated in a machine readable form able to be interpreted by a device player or as a generic script. A generic script can be compiled into a machine executable form for storing in a reference file. For example a generic script may be compiled into one or more machine readable binary instructions, sometimes known as Atoms, which can be executed by the target device.

It should be appreciated that the reference file can include instructions in addition to the instructions for building the translated video structure, or the translated video structure itself.

The reference file compiler 112 can convert any content provider specified control and formatting instructions into appropriate player control parameter values to be stored in the reference file 315. Any desired global or general control parameter values can also be added 320. An example of global parameter values which may be applied to all reference files, are parameter values to designate automatic playing of the content in full screen mode and exit from full screen mode on play ending.

Optionally the reference compiler may add links to additional content 330, such as advertising content. The additional content may be specified by the video content provider, for example additional information to a movie such as a trailer for a sequel or upcoming releases, user driven content, a fingerprint used for DRM, advertising associated with the movie, a link to purchase a music sounds track compilation from the movie, deleted scenes, interviews with actors and directors etc. For example, a content provider web site may enable a user to select from a "pick list" some additional content, such as user generated spoof video clips, outtakes, director commentary, media articles or reviews etc. Links to other additional content such as a sequel trailer and DRM fingerprint may be automatically added in accordance with a content provider control instructions. The links to additional content may be directed to a plurality of different servers.

Additional content may also be user generated content, such as commentary or bookmarks for errors in the movie or interesting observations made by viewers. For example, a user may pause a movie at a particular scene where they have noted an amusing continuity error, the user can create a bookmark comprising a time stamp indicating the time in the movie and a comment or other data the user chooses to associate with the bookmark. A bookmark tool, for example a software application, may be provided to enable users to capture time data and generate bookmarks while they are watching a movie. One or more bookmarks can be stored in a file and the file itself or linking data for the file provided to the content provider or a support server.

A link to the bookmark file may be included in a reference file compiled for the content data. For example, the reference file compiler may be provided with linking data for the bookmark file by the content provider or the reference file compiler may be adapted to search for bookmark files on a support server and include linking data to the bookmark files in the reference file. Alternatively a bookmark file may be used to trigger generation of a reference file. For example, a reference file for a movie or particular scenes of the movie may be generated in response to a selection of a bookmark or bookmark file from a support server. In this instance, accessing the bookmark file can activate a hyperlink to a reference file compiler. The reference file compiler can then generate a reference file in the form of a translated video structure including links to the specific area of the movie file encoded sample data files associated with the bookmark based on the time data from the bookmark. The reference file can also include links to bookmark file content. Where the reference file only links to the portion of the movie associated with the bookmark, the reference file may also include control parameter values to enable linking to the content data provider to access the full movie either through the same translated file structure, by accessing a pre-stored reference file or generating a new reference file for the whole movie.

Additional content may be independent of the video content provider, such as advertising content. A direct link to the additional content file may be provided, similar to the link to the video content file described above. This additional link may be a link to a file stored on the same database or server as the video content or a link to a different server in a different location.

Alternatively a link to a server which controls the additional content may be used. In this instance, the actual content file is not specified, rather a link to a destination server is specified and the server controls the content to be provided to the user device via this link, for example by the server selecting content data and streaming the selected content via this link. For example, the content may be a world cup sporting event which is of interest to people from many countries. The event may be sponsored by a number of different companies from a number of different countries. Sponsors may provide advertising material which can be linked to for downloading and play in conjunction with a user downloading and playing the sporting event content. However, some of the sponsor companies may not be allowed to advertise in some countries where the content is downloaded, for example tobacco advertising bans in Australia, or the sponsor companies may use alternative advertisements in some countries to accommodate language, cultural or religious variation. When a reference file is prepared for the sporting event, a link to additional content can be included as a link to an advertising content server having a rule engine for selecting appropriate content for the user.

Additional content link data is added to the reference file information 340, and any player control instructions for the additional content are converted to player control parameter values 350. The reference file is then compiled 360 whereby the linking data and parameter values are appropriately ordered, formatted and stored to form the reference file 135.

In an embodiment where the reference file is pre-prepared the reference file can then be provided to the video content provider 365. The video content provider can then provide the reference file to user devices, for example via a web site, e-mail, TV broadcast or narrowcast network or as a file stored on a computer readable device such as a floppy disk, optical disk or memory stick.

In an alternative embodiment where reference files are generated on demand the reference file may be provided directly to a user device, for example via the network.

An advantage of providing a reference file comprising linking data and player control parameter values is that the video content provider does not need to relinquish control over the video content data file. Further, enabling the file format to be translated into an alternative file format has an advantage in that the content owner does not need to format data for each specific player, this enables a video content provider to also affiliate themselves with other content providers who may use different file formats. The video content data file 132 remains stored on the content provider's server 130 and in the original file format. The content provider provides only the linking information and any required control information to the reference file compiler 112.

Once a reference file 135 for the video content file is created this reference file 135 can be returned to the content provider or sent to the end user. This reference file contains specific instructions so the end user can receive the linked content in a video file structure suitable for the device, player or operating system the end user is using. The content provider also maintains control over user access to the reference file as the instantiation of the reference file 135 is actuated from the content provider's end point.

Each reference file 135 includes linking data for at least one content file. In the example shown, the reference file includes linking data for a video content file 132. The linking data for the video content file 132 may be information to link via the data network to the location of the video content file 135 itself, or a link to the video content source server 130 and other information to enable access to the video content source file 135.

For example, if the video content source provider implements digital rights management (DRM) to control access to the video content source file 135 the linking data may contain a link to the DRM portal on the video content provider server 130 and information identifying the designated video content. This enables the video content provider to ensure the appropriate authorisation or payment is provided before access is given to the video content data. Data required for DRM authorisation can also be specified by the content provider when the reference file is being created and included in the reference file itself as parameter values. The reference file can be created via a remote platform this remote platform could use authentication for validating the DRM and determine whether to create the reference file or allow access to the content via the reference file based on the outcome of DRM validation.

The linking data may include links to a plurality of content sources having a plurality of different content types and formats, for example movie, advertising, text etc. Each content file is acquired in an individual content data stream. The content files can be acquired in the native format of the content data file, for example ".eps" files for vector graphics, ".txt" files for text, MPEG4 for movie files, etc. Thus, commonly used data formats can be used by content providers and the content provider is able to select the preferred format for their content data. A further advantage of using commonly used data formats is that the user device's native player should generally be adapted to interpret these data formats to play the content. This relieves the need to load additional players for specific content format types onto the user device or to view the content via a website plug-in. In circumstances where the user device player is compatible with the codec used for encoding the content data but not the content data file format, the content can still be played by the reference file providing a translated video structure for converting the file format for compatibility with the player device.

The embodiment illustrated in FIG. 1 enables a generic or native media player 145 already installed on the user device to be used to play the content by using a player interface 120 to interpret the reference file 135 and provide control commands to the player 145. The player interface 120 may be provided as a software application adapted to be installed in a user device or as a server provided function accessed by a user device. For example when entering a video content provider web site or logging in to an Internet television (IPTV) account can include accessing the player interface 120 by the user device 140, such that when the user selects content to view and accesses the content reference file 135, the player interface issues commands to launch and control the user device player 145 for playing the content.

A server based player interface 120 may reside on the support server 110. In other embodiments, the player interface 120 may be provided from a content provider server 130, a network provider server, IPTV service provider server, or other server without limitation. Where a player interface is installed on a user device 140, the player interface 120 may be provided as an application which can be provided as a file downloadable from a server via a network, in an e-mail, stored in a portable memory device or computer readable storage media such as a disk or any other appropriate means.

In an embodiment of the present invention the player interface 120 queries the user device to determine the device capabilities. The device capabilities can include hardware and firmware configuration, for example memory size, buffer size and access speed, processor speed, display size and resolution, operating system version etc, as well as determining video and audio players native to the device or installed on the user device and preferably optimised for the device hardware and operating system. The player interface can also determine the network capabilities, for example available bandwidth and data download rate for the user device. The player interface can then use this information to provide appropriate control commands to the player on the user device for playing the content. This has the advantage of enabling the player and player interface to optimise the quality of the content reproduction based on the capabilities of the user device and external factors such as the data download rate.

The process for playing a video content file by a user is illustrated in FIG. 2. A reference file including linking data and player control parameter values is provided in a manner enabling the reference file to be accessed by the user device 200. In the example shown in FIG. 1 the reference file 135 and video file 132 linked to by the reference file 135 are stored on a on a video content source provider server. The reference file is accessed via a hyperlink 136 from the video content provider's web page 138.

The user accesses 220 the reference file 135 via the hyperlink 136 which causes the player interface 120 to read 192 control parameter values from the reference file 135 and launch 230 the player 145 on the user device 140 in accordance with these parameter values. The player interface 120 uses the linking data from the reference file to instruct the player to acquire 240 the video file 132 from the video content source server 132.

The video file is linked to directly by the user device 140 which starts acquiring the video file as a data stream 170 to the device and stored in device memory and/or buffer 142. This method enables the video file to be linked to and downloaded in a data stream to the user device in the same format as it is stored on the video content provider server.

Where there is linking data for more than one content data file, the player interface instructs the player to acquire a data stream for each content source using the same technique. These data streams may be acquired simultaneously. Whether content data from a plurality of content files is acquired simultaneously as a plurality of data streams or one or more files downloaded sequentially can be controlled based on player control parameter values stored in the reference file or accessed from the content data sources by the player interface. Each content file is acquired individually in its given file format. Thus a plurality of files each having a different format may be acquired and played simultaneously.

The player interface reads player control parameter values 250 and provides commands to the player based on these parameter values to play the video content 260. The player control commands can be used to control the presentation of the video content on the display 148. The content can be presented as the data stream is being acquired.

An advantage of this method is that a player native to the user device hardware can be used to present the video content on the display. This enables a significant amount of control over factors which affect the picture quality to be optimised for the hardware and processing capabilities of the user device. For example the buffer size can be adjusted in accordance with data download and processing speed to minimise jitter or halting, or pixel size can be adjusted or pixel resolution enhanced based on the display capability and screen size. The video content data is acquired as a data stream so all decryption and reproduction processing can be performed by the user device hardware, analogous to a video file being played from a disk installed in a drive of the user device itself.

The player control parameter values can indicate how the video content is to be presented on the display when it is played, for example that the video content is to be played in full screen mode and that the player is to close and revert to a normal screen display once the file is played. The player interface 120 uses the player control parameter values to instruct the player to play the content data.

Figure 5:
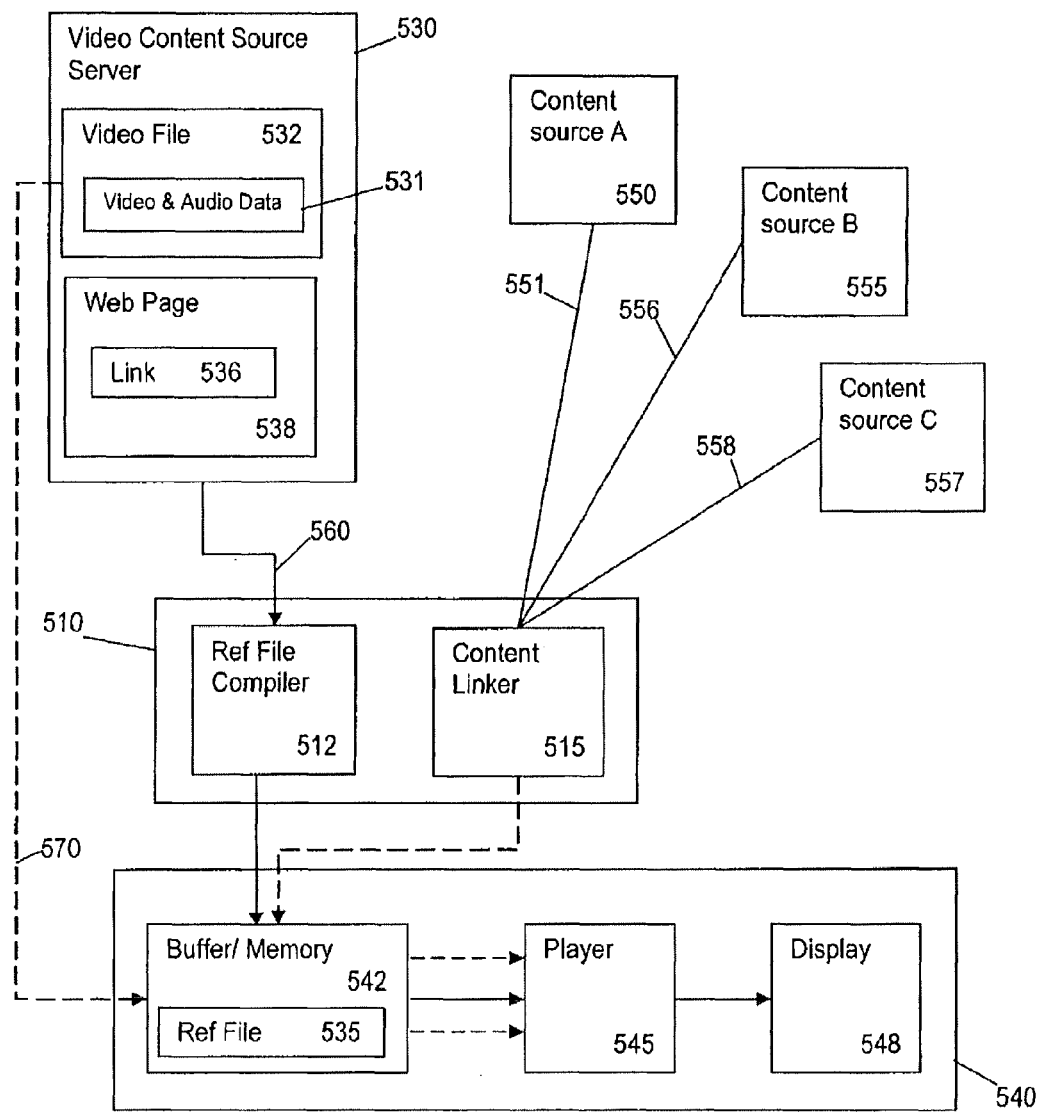
FIG. 5 illustrates a block diagram of a system according to an embodiment.

An embodiment of a system where a reference file is created in response to a user request is illustrated in FIG. 5. The illustrated system 510 comprises a reference file compiler 512 and optional content linker 515. Video content data is stored on a video content source server 530 and other content stored on one or more additional content data sources 550, 555, 557. A user has a network connected device 540 for playing content, for example the device could be a computer, mobile phone, or TV and set top box. The user device has memory 542, a player 545, and a display 548. The player 545 performs functions of decoding content data and driving the display 548 for rendering the content for the user. The player can be embedded in the device operating system or middleware.

Figure 7:
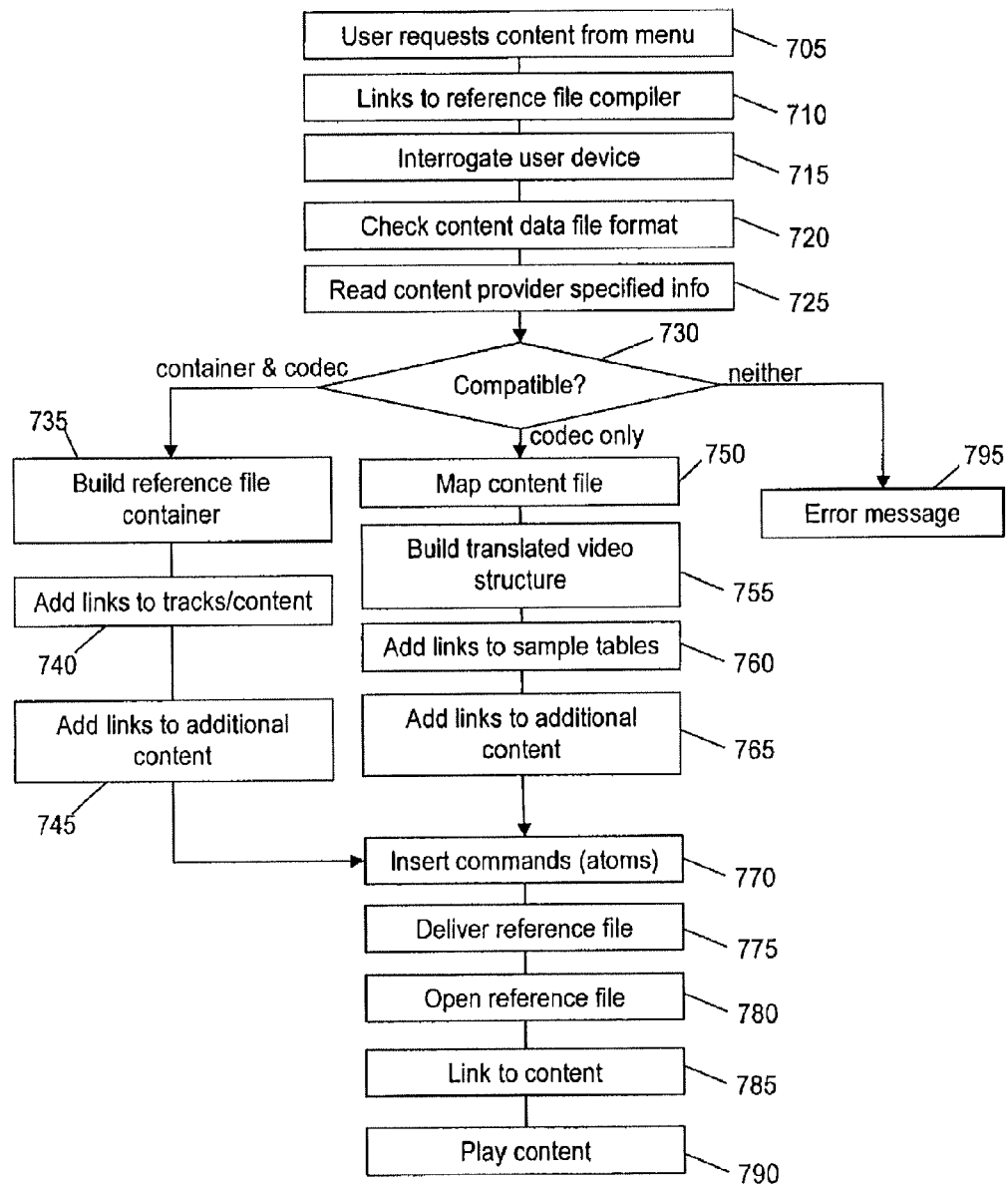
FIG. 7 is a flowchart illustrating an example process for accessing and playing content in a system according to an embodiment.

An example of a process for accessing and playing content in this system is illustrated in FIG. 7. In this example the user requests the video content 705 by selecting an item on a menu or link 536 on a web page 538 on the video content server 530. Accessing the link 536 by the user causes the video content server 530 to link 560, 710 to the reference file compiler 512, for example by a hyperlink to redirect the user to the reference file compiler server. Data exchanged between the video content server 530 and the reference file compiler 512 can include the address of the user device, for example an IP address; and identification data for the video data file on the video content server. Other data such as control or DRM information can also be provided to the reference file compiler.

The reference file compiler 512 can interrogate 715 the user device 540 to determine the device capabilities, such as the container file and codec types the player is compatible with, display dimensions in pixels, buffer size etc. Information such as language settings, local time and age related content censorship/restriction settings may also be read from the user device. Interrogation of the user device may also provide additional information regarding the network environment such as available bandwidth, network latency etc.

The reference file compiler checks the format 720 of the video content data file 532. The reference file compiler can also be provided with additional content provider information 725, such as player control instructions, sponsor advertisement links, subtitle links, ratings information, market specific content edits etc. For example, an edit list may specify scenes to be deleted or skipped for an underage viewer.

The reference file compiler determines 730 whether the format of the video content data file 532 is compatible with the device player 545. The reference file compiler can check for compatibility with the container file format and the codec used for encoding video and audio data within the container file.

In a case where neither the container file nor codec are compatible with the user device an error message can be sent to the user 795.

Where the container file format is compatible with the user device a reference file can be built to link to the container file. In this case the reference file compiler creates a file header 735 which can include control parameter values based on control instructions specified by the content provider, general control instructions specified in the reference file compiler, or based on information read from the target user device during interrogation. For example, player control parameter values may be used to define dimensions of a video surface for rendering the video data, wherein the video surface is based on the aspect ratio of the original source content and the dimensions of the target device display. Defining such data as parameter values can eliminate image distortion problems which may exist for some players due to the player simply stretching an image to match the target display dimensions without consideration or compensation for aspect ratio differences between the image and display.

Linking data to link to the video content data file is inserted into the reference file 740. The linking data may link to the whole of the video data file 532 or to specific tracks within the video data file. For example, a video data file may include a number of alternative audio tracks, each in a different language, and the reference file compiler may select a specific audio track based on the language settings of the user device. In this case as the track header section is in a format compatible with the device player, the linking data can link to the header section rather than just the actual sample data. Links to additional content and any control parameter values associated with the additional content can also be included in the reference file.

Where the player and video content data file container format are incompatible 730 but the audio and visual codecs are compatible with the player, the reference file is built as a translated file structure through which the player device can link to the codec encoded data. In this case the reference file compiler reads the content data file 750 to extract any relevant control data from the header sections and map the coded encoded sections of the data file. A translated video structure is then built 755 having a container file format compatible with the player. Control parameter values based on the data read from the video content data file and any generic control commands can be used to populate the translated video structure. Control parameter values may also be tailored for the target device based on information gathered during the interrogation of the target device.

Links to selected codec encoded video and audio data sections of the content data file are included in the reference file 760. As described above this enables the player to link to the audio and video sample tables within the content data file circumventing any need for the player to interpret the content data container file format. The linking data may link to all encoded sample data tables in the video content data file or only selected sample tables, for example where some scenes are omitted for censorship reasons the sample tables for these scenes may not be linked. Links to data associated with the audio and video content, such as a subtitle track, can also be included. Links to any additional content can also be added into the translated video structure 765. It should be appreciated that the links to additional content may also be links to audio and video sample tables which can be played within the context of the translated video structure. Additional content can be linked to via a content linker 515 adapted to select additional content from one or more additional content data sources 550, 556, 558. It should be appreciated that for translated video structures the content linker may be adapted to link 551, 556, 558 to encoded video and audio data sample tables on additional content data servers 550, 555, 557. Alternatively the content linker may link to additional content data container files or tracks within the container files. The links selected by the content linker may be based on identification of the type of reference file used or control parameter values. Alternatively different links to the content linker could be used to indicate whether to link to sample tables only, tracks or container files.

Additional control commands in the form of binary scripts or atoms can also be included in the reference file 770. The reference file 535 is then delivered to the target device 775 by the reference file compiler and stored in device memory 542. The reference file 535 is opened 780, either automatically or in response to a user command, and the player 545 activated. The player links 785 to the video data file 532 on the content provider server 530 based on the linking data in the reference file 535. The player links 570 to the video data file 532, specific tracks or the encoded audio and visual sample data tables 531 within the video file depending on the linking data included in the reference file. The player acquires the data directly from the video content server or other servers in the case of additional content. The data is downloaded to device buffer memory and this data acquisition from the perspective of the player is analogous to the data being read to the buffer from connected hardware such as a DVD reader, hard disk or video camera. The data is stored to buffer memory as it is downloaded from the network and the player reads the data form buffer memory for decoding and rendering the content for the user 790.

It should be appreciated that by providing a reference file having a structure that is native to the player or operating system the player or operating system is able to interpret and play encoded audio and video data from the content source provider which may not be stored in a format that would ordinarily be playable on the target device.

In an embodiment where there is a plurality of content data streams, the play control parameter values can include instructions for presenting content from two or more data streams simultaneously. Data from each stream is separately decoded and presented in accordance with player control parameter values associated with the respective data stream. For example, control parameter values can be used to manage different aspect ratios for a plurality of content data streams by defining dimensions of a video surface for each content data stream, such that the content can be rendered to its defined video surface. This enables the different aspect ratio content to be displayed on the display without changing resolution the device of player. The respective video surfaces can be defined to avoid distortion of the displayed images due to stretching.

Figure 4:
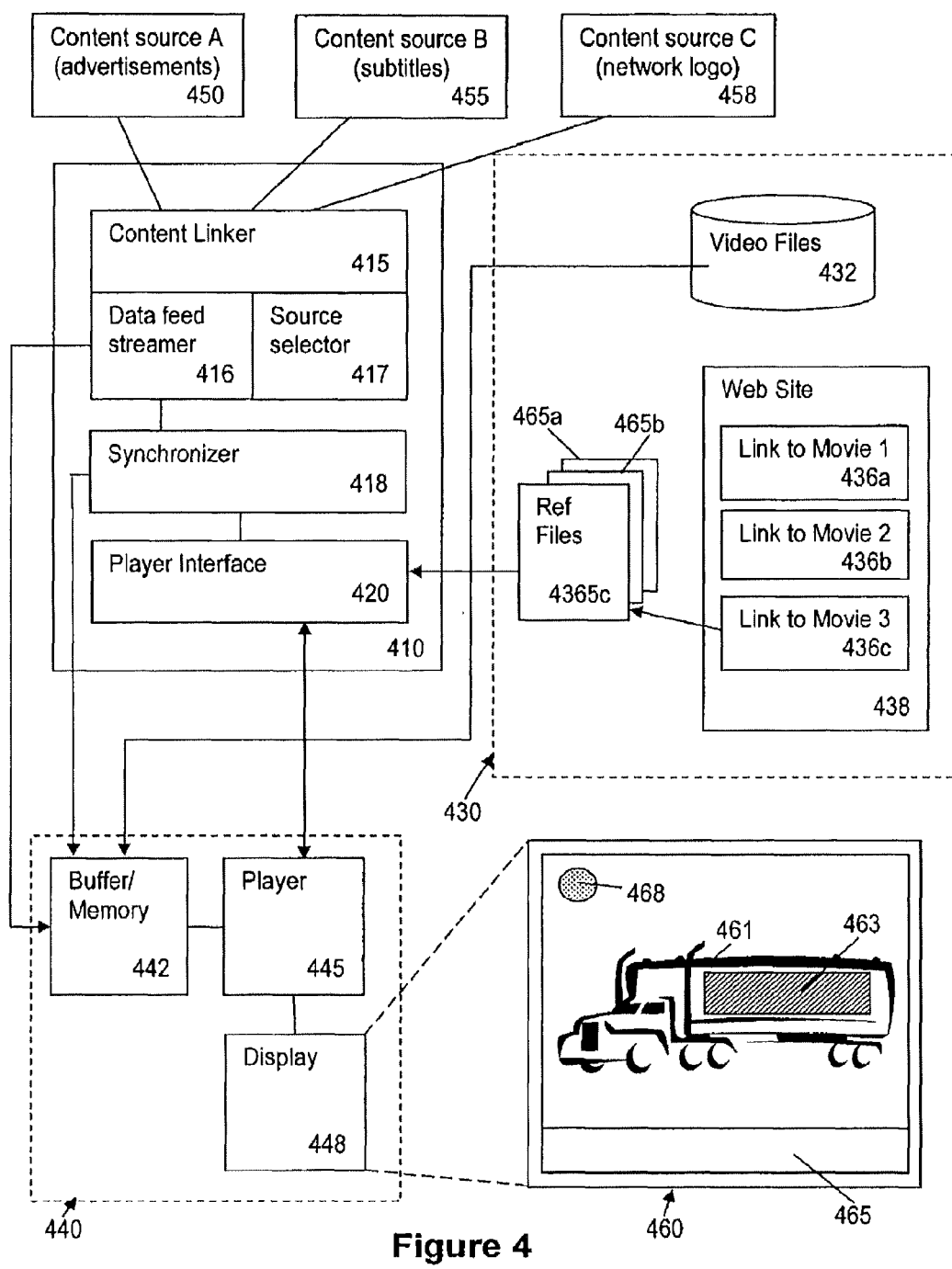
FIG. 4 illustrates an application of an embodiment the present invention.

The content from each data stream can be presented simultaneously in a separate layer, for example the content from one data stream is displayed overlayed on content from another data stream. Alternatively, content from different data streams may be displayed in different areas on the display, or a combination of overlaying content and dividing the screen may be used. Parameter values can be used to define which layer a content data stream is to be presented as and how the layers of content are superposed when presented on the display. Control commands or data, such as synchronisation data, additional to that stored in the reference file can also be provided by the support server or content source servers to the user device or player interface based on the requirements for coordination and presentation of the plurality of data streams. An example of playing content from a plurality of data streams is illustrated in FIG. 4. In the example of FIG. 4 the first content data is a movie file stored in a video content provider network database 432. A link data for the movie file is included in a reference file 435c which is linked to via a hyperlink 436c on the movie provider web site 438. The reference file 435c also includes linking data for a content linker 415 of the support server 410.

In this embodiment the content linker includes a source selector 417 for selecting the content sources for additional data to the movie and a data feed streamer 416 from which the additional content from the selected sources is acquired as data streams by the user device 440. The source selector 417 can be adapted to select one or more content source providers or particular content data files to provide as additional content to the movie based on designated criteria. The source selector 417 can select more than one additional content source 450, 455, 458. The content data files to be downloaded to the user device 440 from each content source 450, 455, 458 via the data feed streamer 416 may be selected by the respective content source provider 450, 455, 458 or by the source selector 417. The selection criteria for use by the source selector 417 or content sources 450 455 458 to select additional content data can be based on any information associated with the user selecting the reference file for playing the content. Different selection criteria may be used for each additional content source. Some examples of the types of information which may be used for selecting additional content data include but are not limited to: user preferences stored in the user device; user profile information from a network access account; Internet television (IPTV) account information; parameter values from the reference file; network provider information; and user geographical location information.

Referring to the example shown in FIG. 4 the additional content sources selected are content source A 450 which provides advertisements, content source B 455 which provides subtitles, and content source C 458 which is a server storing picture file of the network carrier logo.

Each of these sources may be selected using different criteria. For example, user account information or user input, such as a command or response to a query, could be used to determine whether or not subtitles are required for the movie and based on this content source B 455, a subtitle server, is selected. The movie is identified using data from the reference file and the appropriate subtitle language may be selected automatically based on language preference information stored in a user profile. Content source C 458 may be automatically selected for any content being played based on the carrier network provider being used, such as the user's local carrier network service provider or Internet service provider (ISP). Thus, the video file content server may be located in the United States, however a user in Australia is using the Telstra network to acquire the content, based on this the source selector may select the Telstra network logo to display as additional content. The advertiser, content source A 450, may be automatically selected by the support server every time user accesses content, for example where IPTV access is sponsored by the advertiser so the movies can be viewed for free by the users in return for them also having to view advertisements. Further, the advertiser 450 may be selected from a plurality of advertisers based on selection criteria such as sponsorship of a particular video content source provider, user demographic information, selected movie, geographical location of the user etc.

The content linker 415 establishes the links to the selected additional content sources 450 455 458 and the data feed streamer 416 controls the download of data from each of the additional content sources 450 455 458 to the user device 440 as individual content data streams. The content data stream for each content source 450 455 458 may each have a different format.

The synchroniser 418 is adapted to provide additional control data to the user device 440 and player interface 420 where the presentation to the user of data from one or more sources needs to be synchronised. For example, if a sponsorship agreement between the video content provider 430 and an advertiser 450 provides that for users with free accounts an advertisement is to be played prior to the playing of the movie, then the synchroniser can instruct the player interface 420 to command the player to play the content data fed from content source A for a particular period of time, the length of the advertisement, before playing the movie content data. If the movie is to be interrupted at given intervals for playing advertisements then the synchroniser may provide this data to the player interface, for example as a collection of interrupt intervals to be used to interrupt the player and interrupt durations or as a time track to download to the player such that the player will automatically switch between playing the advertising content at the movie content at specified times.

In embodiments where content from a plurality of content sources is played simultaneously in a plurality of layers, a time track may also be used to synchronise play instructions for the plurality of layers, for example, synchronising playing of a text file of subtitles with playing a movie. Alternatively timing data may be used for switching between different content data streams, for example, an advertising content may be played as scheduled intervals.

In the example of FIG. 4, content from each data source is allocated a separate layer. In the context of this description the term "layer" is used to refer to separate pieces of video content displayed simultaneously or in a coordinated manner. For example, where different content is displayed simultaneously, different content layers appear to be superimposed or overlaying each other when displayed. The content of each layer can be acquired from a different data source alternatively two or more layers can be different tracks acquired form the same data source.

In the example of FIG. 4 the first layer is the movie data acquired from the video file database 432. The second layer is a picture comprising an advertising logo for a sponsor acquired from content source C 458, the third layer is text subtitles acquired from content source B 455, and the fourth layer is advertising content obtained from content source A 450. The content for the second third and fourth layer are all acquired as separate data streams via the content linker 415 and data stream feeder 416 of the support server 410. Each of the content data streams, and any accompanying synchronisation data, are downloaded and buffered separately in the user device 440 memory 442 for playing by the player 445 as separate layers.

A screen image 460 illustrates an example of how the overlayed layers can be presented on the display 448 of the user device 440 when they are played.

The movie is played in accordance with player control instructions for this first layer, such as playing the video content in a full screen mode.

The logo of the second layer content and is played in accordance with player control instructions for this second layer, such as the picture being displayed as a semi-transparent watermark over the video content in a designated area 468 of the display, such as the upper left hand corner of the display. The designated area can be defined using pixel coordinates, using a given size and relative display position, a proportion of the display area in a given position etc.

The subtitle content of the third layer in this example is a text file and is synchronised with the movie using a time code track which defines the timing for the display of each line of text, based on the corresponding timing of the lines being spoken in the movie. Thus the subtitles are played synchronised with the movie. The display area 465 for displaying the subtitles superimposed over the movie can be defined in player control parameter values, for example as parameter values stored in the reference file 435*c* or as a user preference.

The advertising content of layer 4 in this example is played as a product placement overlay on the movie. In the screen illustration 460 a truck 461 is displayed as part of the movie of the first layer. Advertising content, such as a picture of a product name and logo, can be presented in a designated area 463 corresponding to the side of the truck 461. The designated area 463 may also be specified for a plurality of subsequent frames corresponding to the position of the truck 461 as it moves across the screen such that the advertisement appears to a user to be part of the movie. A time code track can be used to synchronise the playing of the advertisement with that of the movie. Advertising content may also comprise moving picture or static content which may be presented in a designated area of the display in the context of the movie, such as on a TV screen in a scene of a movie, or independent of other content, for example presented in a banner across the top of the display. A plurality of different techniques for presenting advertising content may be used for advertising content from a single source. The manner in which the advertising content is displayed is based on player control commands. A plurality of data files may be obtained from a single content provider each having an associated set of control instructions. The format of each content data file is independent of others.

In this manner the data stream for each layer is acquired and decoded independently for each layer, and presented simultaneously on the display in accordance with the player control instructions. Thus, there is no aggregation or combining of the data from the plurality of data streams prior to their presentation on the display. Each data stream is processed and presented as a separate layer. This enables flexible combining of content from a plurality of sources. Further the content data from one source may be modified independently of each other data source. Thus, content may be modified on an ad hoc basis by an advertiser without requiring reformatting of the movie file. This also enables selection of data sources for each layer to be performed individually for each user based on the defined selection criteria.

Further, using an intermediary server, such as the support server, to perform selection and synchronisation of additional data content enables the additional data sources and criteria for their selection to be readily modified without requiring a new reference file to be generated. For example enabling sponsors for a video content provider network of IPTV service to be changed without requiring regeneration of already existing reference files.

As each layer of content is downloaded and decoded individually by the user device player, the content providers are not limited to using a predetermined file format.

A further one or more layers can also be provided to cater for interactivity with the content data being displayed by the user. For example, an advertisement may include linking data enabling the user to send a request for further information, accept an offer or make a purchase. In this embodiment a user is provided with an interface to enable them to input requests or data while the content is played. For example, a user may use a PC mouse to move a pointer over an advertisement to select and purchase an advertised item. Based on the position of the mouse when a select button is pressed, the interface determines which item is selected and can perform actions, as in accordance with an associated application or script, to automatically transmit information regarding the user request back to the advertiser via the network.

The system can also include tracking functions which can be used for monitoring consumer behaviours or for billing purposes. For example a script in the reference file may trigger data to be sent to a tracking module included in the support server or the content provider server which in turn can be used trigger a billing event. Alternatively the support server can include a tracking module for monitoring the quantity of advertising data downloaded from each advertising data provider and identify from which video content provider is associated with the reference file which triggered the download, which can in turn be used for use based remittance or billing between advertisers and video content providers.

Embodiments of the invention can be implemented using an open API (application programming interface) structure which enables the system to be readily adapted to operate in any chosen system architecture. Further the open API structure also enables the system to be compatible with a plurality of network architectures. The player interface may be implemented as a software application, using a language such as Java.

The reference file compiler can be an optional function of the support server. An embodiment of the reference file compiler can also be provided as an independent module. For example, a reference file compiler may be provided as a software application to video content providers to enable them to prepare their own reference files.

Although the invention has been described with reference to specific examples and embodiments, it should be readily understood by a skilled person that adaptations made to the system and method described are envisaged within the scope of embodiments of the invention.

Example 1

An example of scripts used to prepare a reference file to insert some of the commands, parameter values and linking data are shown below. In this example the reference file is prepared using the QuickTime™ scripting language. Developed by Apple Computer™, QuickTime™ is a media player having an associated scripting language to enable programmers to prepare script files of instructions for the player.

Although this example is given using QuickTime™, this is only one possible implementation and a person skilled in the art will recognise that the reference files, player and player interface could be implemented using any suitable language and tools. All possible variants are contemplated within the scope of the present invention.

```
property overlay_offset : 0
property target_URL : "http://"
tell application "QuickTime Player"
    if not (exists movie 1) then return
stop every movie
-- this routine uses the gestaltVersion_info( ) sub-routine
copy my gestaltVersion_info("sysv", 4) to {system_version, system_string}
if the system_version is less than "0860" then
    display dialog "This script requires Mac OS 8.6 or higher." & $$
        return & return & "The currently installed version is: " & $$
        system_string buttons {"Cancel"} default button 1
end if
open overlay_file
    set open movie in new player to the stored_status
    -- EXTRACT THE DIMENSIONS OF THE OVERLAY FILE
```

```
  copy the natural dimensions of movie 1 to {overlay_width, overlay_height}
  close movie 1 saving no
on error
  display dialog "There was a problem opening the overlay file." buttons {"Cancel"}
           default button 1
end try
display dialog "Place the overlay image at the bottom left or bottom right of the movie?"
       buttons {"Cancel", "Left", "Right"} default button 3
set the overlay_postion to the button returned of the result
```

Prompt for the Overlay Link

```
repeat
   display dialog "Enter the overlay URL link:" default answer
   target_URL
   set the target_URL to the text returned of the result
   if the target_URL is not "" then exit repeat
end repeat
```

Prompt for New Page or Same Page

```
display dialog "Open the URL in the same page as the movie or a new page?" buttons
       {"Cancel", "Same", "New"} default button 3
set the destination_page to the button returned of the result
if the destination_page is "Same" then
 set the display_method to "pause"
else
 set the display_method to "new"
end if
try
 set this_file to the original file of movie 1
 -- extract the file name and parent folder
 set AppleScript's text item delimiters to ":"
 set the movie_filename to the last text item of (this_file as text)
 set the parent_folder to ((text items 1 thru -2 of (this_file as text)) as string) & ":"
 set AppleScript's text item delimiters to ""
 set the temp_filename to the movie_filename
 -- remove the .mov extension
 if the movie_filename ends with ".mov" then
    set the temp_filename to ((characters 1 thru -5 of movie_filename) as string)
 end if
 -- shorten the movie name
 if the length of the the movie_filename is greater than 29 then
    set the temp_filename to ((characters 1 thru 20 of movie_filename) as string)
 end if
 set the caption_filename to (the temp_filename & ".txt")
 -- shorten the movie name
 if the length of the the movie_filename is greater than 23 then
    set the temp_filename to ((characters 1 thru 23 of movie_filename) as string)
 end if
-- add the identifier extension
set SMIL_filename to (the temp_filename & "-smi.mov")
repeat
   -- check the file name
   tell application "Finder"
        set file_exists to (exists file SMIL_filename of folder parent_folder)
   end tell
   if file_exists is true then
        display dialog "The file name to be used for the finished SMIL file is already in
                 use. " &¬
           "Enter another:" default answer SMIL_filename buttons {"Cancel",
                             "Replace", "OK"} default button 3
        copy the result as list to {this_text, button_pressed}
        if the button_pressed is "Replace" then
           tell application "Finder"
                try
                    move (file SMIL_filename of folder parent_folder) to the
                          trash
                end try
                exit repeat
           end tell
        else if the length of this_text is greater than 31 then
           display dialog "The name must be less than 31 characters."
        else if this_text contains ":" then
```

```
            display dialog "A file name cannot contain a colon (:)."
        else if this_text is not "" then
            set the SMIL_filename to this_text
        end if
    else
        exit repeat
    end if
    -- this routine uses the gestaltVersion_info( ) sub-routine
    copy my gestaltVersion_info("qtim", 8) to {QT_version, QT_string}
    if the QT_version is less than "0500" then
        display dialog "This script requires QuickTime 5.0 or higher." &¬
            return & return & "The currently installed version is: " &¬
            QT_string buttons {"Cancel"} default button 1
    end if
    tell movie 1
        set auto_play_status to auto play
        set close_status to close when done
        set auto_close_status to auto close when done
        set quit_status to quit when done
        set auto_quit_status to auto quit when done
        set auto_present_status to auto present
        set presentation_size to presentation size
        set presentation_mode to presentation mode
    end tell
    display dialog "Playback Properties" & return & return &¬
        "Auto Play: " & auto_play_status & return &¬
        "Close When Done: " & close_status & return &¬
        "Auto Close When Done: " & auto_close_status & return &¬
        "Quit When Done: " & quit_status & return &¬
        "Auto Quit When Done: " & auto_quit_status & return &¬
        "Auto Present: " & auto_present_status & return &¬
        "Presentation Size: " & presentation_size & return &¬
        "Presentation Mode: " & presentation_mode buttons {"OK"} default button 1
end tell
on gestaltVersion_info(gestalt_code, string_length)
    try
        tell application "Finder" to¬
            copy my NumToHex((system attribute gestalt_code),¬
                string_length) to {a, b, c, d}
        set the numeric_version to {a, b, c, d} as string
        if a is "0" then set a to ""
        set the version_string to (a & b & "." & c & "." & d) as string
        return {numeric_version, version_string}
    on error
        return {"", "unknown"}
    end try
end gestaltVersion_info
on NumToHex(hexData, stringLength)
    set hexString to { }
    repeat with i from stringLength to 1 by −1
        set hexString to ((hexData mod 16) as string) & hexString
        set hexData to hexData div 16
    end repeat
    return (hexString as string)
end NumToHex
```

The invention claimed is:

1. A method of receiving video content, the method comprising:

accessing a reference file using a data network-connected device including a native player;

executing the reference file with the data network-connected device and forming a video content container file configured to be compatible with and executable by the native player, the reference file also including a plurality of player control parameter values and linking data linking to a content data file at a designated content source, the content data file including at least header data and content data, and the linking data linking only to at least a portion of the content data within the content data file;

actuating the play control parameter values from the reference file, via associated play control commands on the data network-connected device, and directing the native player to execute the video content container file to acquire the at least a portion of content data from the designated content source over a data network in accordance with the linking data; and playing the at least a portion of the content data acquired from the designated content source, via the native player executing the video content container file, as directed by the play control commands, wherein accessing the reference file includes accessing, if a format of the content data file is incompatible with the native player, the reference file generated to have a translated video structure compatible with the native player, wherein the linking data is linked to codec-encoded data of the content data file and compatible with the translated video structure.

2. A method as claimed in claim 1, wherein acquiring the at least a portion of the content data further comprises forming the translated video structure compatible with the native player, with the native player and via the play control parameter values associated with the play control commands, for any of the content data wherein the format is incompatible with the native player, using the codec-encoded data of the content data file accessed via the linking data.

3. A method as claimed in claim 1, wherein acquiring the at least a portion of the content data further comprises acquiring the at least a portion of the content data from the designated content source as at least one data stream, each of the at least one data stream representing a different layer of the video content data.

4. A method as claimed in claim 3, wherein acquiring the at least a portion of the content data from the designated content source as at least one data stream, further comprises acquiring the at least a portion of the content data from the designated content source as at least one data stream, each of the at least one data stream representing a different layer of the video content data, and concurrently displaying at least two layers of the content data on a display associated with the data network connected device when the at least a portion of the content data is played in accordance with the play control commands.

5. A method as claimed in claim 3, wherein acquiring the at least a portion of the content data from the designated content source as at least one data stream, further comprises acquiring the at least a portion of the content data from the designated content source as at least one data stream, each data stream having a different data format.

6. A method as claimed in claim 3, wherein accessing a reference file, further comprises accessing a reference file including a plurality of play control parameter values and linking data, and linking, via the linking data, to a support server to select the at least one data stream acquired by the native player.

7. A method as claimed in claim 6, further comprising selecting, via the support server, the at least one data stream acquired by the native player based on at least one of user data, content provider data, network service provider data, and geographic data.

8. A method as claimed in claim 3, wherein acquiring the at least a portion of the content data from the designated content source as at least one data stream, further comprises acquiring the at least a portion of the content data from the designated content source as at least one data stream, one of the at least one data stream including layer presentation control data.

9. A method as claimed in claim 8, wherein acquiring the at least a portion of the content data from the designated content source as at least one data stream, one of the at least one data stream including layer presentation control data, further comprises acquiring the at least a portion of the content data from the designated content source as at least one data stream, one of the at least one data stream including layer presentation control data, with the layer presentation control data including layer synchronization data.

10. A method as claimed in claim 1, wherein accessing a reference file, further comprises accessing a reference file via a video content provider web site.

11. A method as claimed in claim 10, wherein accessing a reference file, further comprises accessing a reference file including a plurality of play control parameter values and linking data, the linking data including a link to a video file accessed through the video content provider web site.

12. A method as claimed in claim 1, further comprising launching the native player on the data network connected device in response to accessing the reference file.

13. A method as claimed in claim 1, wherein acquiring the at least a portion of the content data further comprises acquiring the at least a portion of the content data compatible with the native player from the designated content source.

14. A method as claimed in claim 1, wherein acquiring the at least a portion of the content data, further comprises acquiring, using the linking data linking through a digital rights management (DRM) portal, the at least a portion of the content data from the designated content source.

15. A method as claimed in claim 1, wherein accessing a reference file, further comprises accessing a reference file on a server via the data network.

16. A method as claimed in claim 1, wherein accessing a reference file, further comprises accessing a reference file generated in response to the request.

17. An apparatus for receiving video content, including a data network connected device having a device display controller including a native player, and comprising a processor configured to control the apparatus to at least:
  access a reference file using a data network-connected device including a native player;
  execute the reference file with the data network-connected device and form a video content container file configured to be compatible with and executable by the native player, the reference file also including a plurality of player control parameter values and linking data linking to a content data file at a designated content source, the content data file including at least header data and content data, and the linking data linking only to at least a portion of the content data within the content data file;
  actuate the play control parameter values from the reference file, via associated play control commands on the data network-connected device, and direct the native player to execute the video content container file to acquire the at least a portion of content data from the designated content source over a data network in accordance with the linking data; and
  play the at least a portion of the content data acquired from the designated content source, via the native player executing the video content container file, as directed by the play control commands,
  wherein the processor is configured to control the apparatus to access, if a format of the content data file is incompatible with the native player, the reference file generated to have a translated video structure compatible with the native player, wherein the linking data is linked to codec-encoded data of the content data file and compatible with the translated video structure.

18. An apparatus according to claim 17, wherein the processor is further configured to form the translated video structure compatible with the native player, with the native player and via the play control parameter values associated with the play control commands, for any of the content data wherein the format is incompatible with the native player, using the codec-encoded data of the content data file accessed via the linking data.

19. An apparatus according to claim 17, wherein the processor is further configured to control the apparatus to acquire the at least a portion of the content data from the designated content source as at least one data stream, each of the at least one data stream representing a different layer of the video content data.

20. An apparatus according to claim 19, wherein the processor is further configured to control the apparatus to acquire the at least a portion of the content data from the designated content source as at least one data stream, each of the at least one data stream representing a different layer of the video content data, and to concurrently display at least two layers of the content data on a display associated with the data network connected device when the at least a portion of the content data is played in accordance with the play control commands.

21. An apparatus according to claim 19, wherein the processor is further configured to control the apparatus to acquire the at least a portion of the content data from the designated content source as at least one data stream, each data stream having a different data format.

22. An apparatus according to claim 19, wherein the processor is further configured to control the apparatus to access a reference file including a plurality of play control parameter values and linking data, and to link, via the linking data, to a support server to select the at least one data stream acquired by the native player.

23. An apparatus according to claim 22, wherein the processor is further configured to control the apparatus to select, via the support server, the at least one data stream acquired by the native player based on at least one of user data, content provider data, network service provider data, and geographic data.

24. An apparatus according to claim 19, wherein the processor is further configured to control the apparatus to acquire the at least a portion of the content data from the designated content source as at least one data stream, one of the at least one data stream including layer presentation control data.

25. An apparatus according to claim 24, wherein the processor is further configured to control the apparatus to acquire the at least a portion of the content data from the designated content source as at least one data stream, one of the at least one data stream including layer presentation control data, with the layer presentation control data including layer synchronization data.

26. An apparatus according to claim 17, wherein the processor is further configured to control the apparatus to access a reference file via a video content provider web site.

27. An apparatus according to claim 26, wherein the processor is further configured to control the apparatus to access a reference file including a plurality of play control parameter values and linking data, the linking data including a link to a video file accessed through the video content provider web site.

28. An apparatus according to claim 17, wherein the processor is further configured to control the apparatus to launch the native player on the data network connected device in response to accessing the reference file.

29. An apparatus according to claim 17, wherein the processor is further configured to control the apparatus to acquire the at least a portion of the content data compatible with the native player from the designated content source.

30. An apparatus according to claim 17, wherein the processor is further configured to control the apparatus to acquire, using the linking data linking through a digital rights management (DRM) portal, the at least a portion of the content data from the designated content source.

31. An apparatus according to claim 17, wherein the processor is further configured to control the apparatus to access a reference file on a server via the data network.

32. An apparatus according to claim 17, wherein the processor is further configured to control the apparatus to access a reference file generated in response to the request.

33. A computer program product comprising at least one non-transitory computer readable storage medium having computer program code stored thereon for receiving video content with a data network connected device having a device display controller including a native player, the computer program code comprising:
    program code for accessing a reference file using a data network-connected device including a native player;
    program code for executing the reference file with the data network-connected device and for forming a video content container file configured to be compatible with and executable by the native player, the reference file also including a plurality of player control parameter values and linking data linking to a content data file at a designated content source, the content data file including at least header data and content data, and the linking data linking only to at least a portion of the content data within the content data file;
    program code for actuating the play control parameter values from the reference file, via associated play control commands on the data network-connected device, and for directing the native player to execute the video content container file to acquire the at least a portion of content data from the designated content source over a data network in accordance with the linking data; and
    program code for playing the at least a portion of the content data acquired from the designated content source, via the native player executing the video content container file, as directed by the play control commands,
    wherein the program code for accessing the reference file further comprises program code for accessing, if a format of the content data file is incompatible with the native player, the reference file generated to have a translated video structure compatible with the native player, wherein the linking data is linked to codec-encoded data of the content data file and compatible with the translated video structure.

34. A computer program product according to claim 33, wherein the program code for acquiring the at least a portion of the content data further comprises program code for forming the translated video structure compatible with the native player, with the native player and via the play control parameter values associated with the play control commands, for any of the content data wherein the format is incompatible with the native player, using the codec-encoded data of the content data file accessed via the linking data.

35. A computer program product according to claim 33, wherein the program code for acquiring the at least a portion of the content data further comprises program code for acquiring the at least a portion of the content data from the designated content source as at least one data stream, each of the at least one data stream representing a different layer of the video content data.

36. A computer program product according to claim 35, wherein the program code for acquiring the at least a portion of the content data from the designated content source as at least one data stream, further comprises program code for acquiring the at least a portion of the content data from the designated content source as at least one data stream, each of the at least one data stream representing a different layer of the video content data, and program code for concurrently displaying at least two layers of the content data on a display associated with the data network connected device when the at least a portion of the content data is played in accordance with the play control commands.

37. A computer program product according to claim 35, wherein the program code for acquiring the at least a portion of the content data from the designated content source as at least one data stream, further comprises program code for acquiring the at least a portion of the content data from the designated content source as at least one data stream, each data stream having a different data format.

38. A computer program product according to claim 35, wherein the program code for accessing a reference file, further comprises program code for accessing a reference file including a plurality of play control parameter values and linking data, and program code for linking, via the linking data, to a support server to select the at least one data stream acquired by the native player.

39. A computer program product according to claim 38, further comprising program code for selecting, via the support server, the at least one data stream acquired by the native player based on at least one of user data, content provider data, network service provider data, and geographic data.

40. A computer program product according to claim 35, wherein the program code for acquiring the at least a portion of the content data from the designated content source as at least one data stream, further comprises program code for acquiring the at least a portion of the content data from the designated content source as at least one data stream, one of the at least one data stream including layer presentation control data.

41. A computer program product according to claim 40, wherein the program code for acquiring the at least a portion of the content data from the designated content source as at least one data stream, one of the at least one data stream including layer presentation control data, further comprises program code for acquiring the at least a portion of the content data from the designated content source as at least one data stream, one of the at least one data stream including layer presentation control data, with the layer presentation control data including layer synchronization data.

42. A computer program product according to claim 33, wherein the program code for accessing a reference file, further comprises program code for accessing a reference file via a video content provider web site.

43. A computer program product according to claim 42, wherein the program code for accessing a reference file, further comprises program code for accessing a reference file including a plurality of play control parameter values and linking data, the linking data including a link to a video file accessed through the video content provider web site.

44. A computer program product according to claim 33, further comprising program code for launching the native player on the data network connected device in response to accessing the reference file.

45. A computer program product according to claim 33, wherein the program code for acquiring the at least a portion of the content data further comprises program code for acquiring the at least a portion of the content data compatible with the native player from the designated content source.

46. A computer program product according to claim 33, wherein the program code for acquiring the at least a portion of the content data, further comprises program code for acquiring, using the linking data linking through a digital rights management (DRM) portal, the at least a portion of the content data from the designated content source.

47. A computer program product according to claim 33, wherein the program code for accessing a reference file, further comprises program code for accessing a reference file on a server via the data network.

48. A computer program product according to claim 33, wherein the program code accessing a reference file, further comprises program code for accessing a reference file generated in response to the request.

\* \* \* \* \*